Oct. 24, 1939.   D. ROBERTS   2,176,945
CONTINUOUS MOLDING DEVICE
Filed Oct. 14, 1935   2 Sheets-Sheet 1

INVENTOR.
Dudley Roberts
BY
ATTORNEY.

Oct. 24, 1939.　　　　　D. ROBERTS　　　　2,176,945
CONTINUOUS MOLDING DEVICE
Filed Oct. 14, 1935　　　2 Sheets-Sheet 2
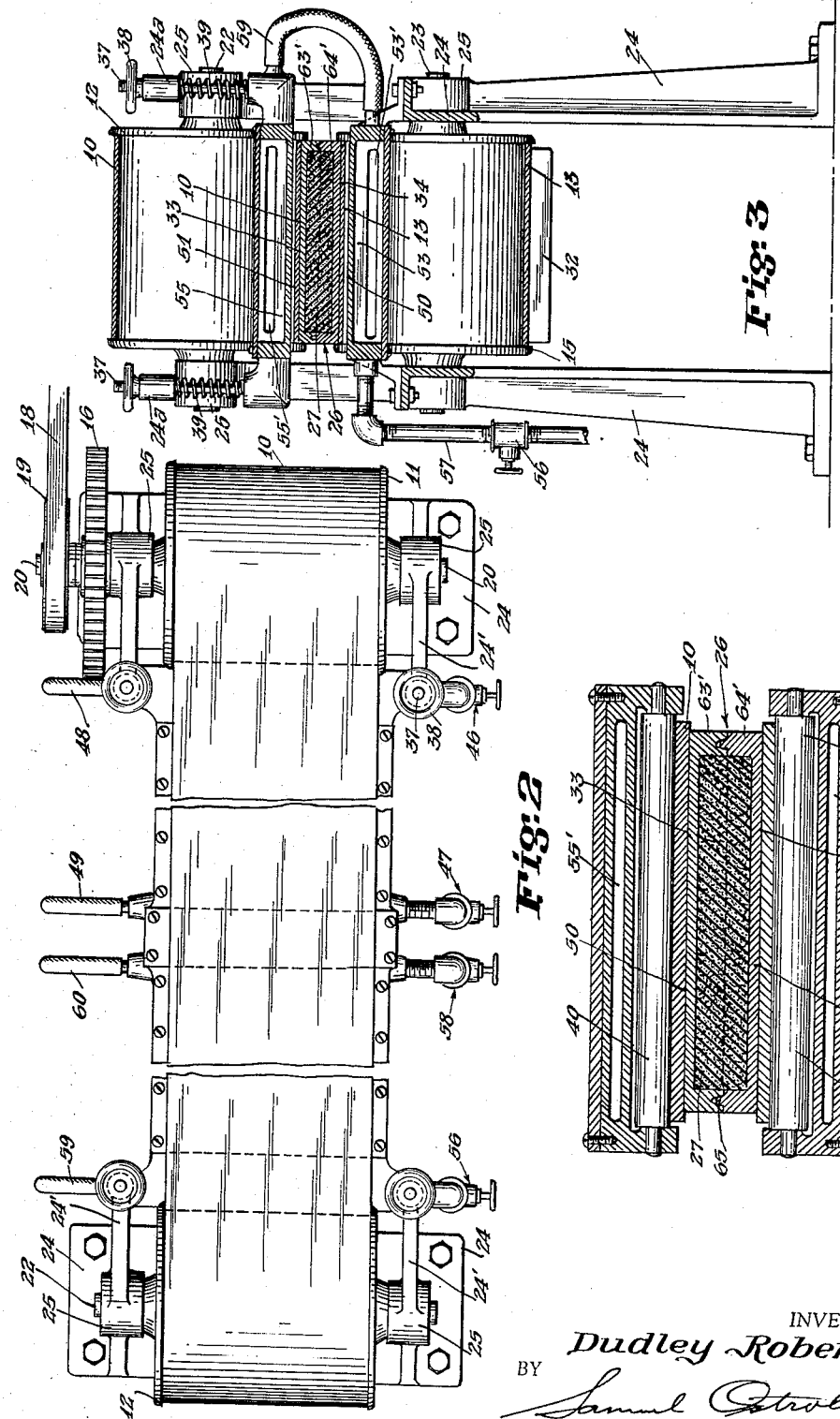
INVENTOR.
Dudley Roberts
BY
ATTORNEY.

Patented Oct. 24, 1939

2,176,945

UNITED STATES PATENT OFFICE 2,176,945

CONTINUOUS MOLDING DEVICE

Dudley Roberts, New York, N. Y., assignor to Rubatex Products, Inc., New York, N. Y., a corporation of Delaware Application October 14, 1935, Serial No. 44,807

3 Claims. (Cl. 18—6)

My invention relates to a novel method of and apparatus for automatically molding plastic materials and, more particularly, relates to an automatic continuous process for finally curing gas expanded rubber.

The manufacture of gas expanded rubber consists in thoroughly impregnating a suitable rubber mixture with an inert gas at a very high pressure and then partially heat treating it to entrap the gas. The gassed mixture is then finally heat treated in molds for vulcanization and expansion to a desired form. There results an expanded rubber product having a myriad of small, individual gas cells. Such a process is the basis of the Denton patents such as U. S. Patent No. 1,905,269 dated April 25, 1933, and the copending U. S. application Serial No. 717,550, filed March 27, 1934, of which I am a co-inventor.

In the final heat treating stage, the gassed rubber dough is first forced into molds. These molds are then generally placed between steam heated platens in a hydraulic press. Another method is to use an electric or otherwise heated oven requiring a mold construction, the parts of which must be tightly secured by bolts. During the heating of the molds, the gassed rubber expands and exerts considerable pressure in the mold. The hydraulic press or specially constructed bolted molds or other means are therefore necessary to prevent the molds from being forced apart. After the heating stage, the molds are then cooled to approximately room temperature so that there will be no tendency for the entrapped gas cells to rupture.

Such methods consume considerable time since the operations involved are essentially manual. The molds are placed in the press or oven which is then adjusted and suitably heated to effect the final vulcanization and expansion of the rubber, and subsequently cooled. The hydraulic press and oven must be prepared, heated up, cooled down and then taken apart as each batch of material is vulcanized. Besides the time and labor involved in using such methods, a relatively large investment in duplicate equipment is needed for regular commercial production.

I have invented a process for effecting the final heat treatment of gas expanded rubber in a continuous manner. According to my invention, molds are introduced between two revolving steel sheets which convey them through steam heated chambers and then through a cooling section with the necessary pressure being continually applied.

Accordingly, an object of my invention is to provide a novel process for the manufacture of molded plastic products.

Another object of my invention is to provide a novel process for the manufacture of gas expanded rubber products.

Still another object of my invention is to provide a novel continuous process for final vulcanization of gas expanded rubber products.

A further object of my invention is to provide novel apparatus for continuously effecting the final heat treating stage in the production of gas expanded rubber products.

There are other objects of my invention which will become apparent in the following description in connection with the drawings, in which:

Figure 2 is a top view of the same apparatus.

Figure 3 is the sectional view 3—3 through Figure 1.

Figure 4 is the sectional view 4—4 through Figure 1.

Figure 1:
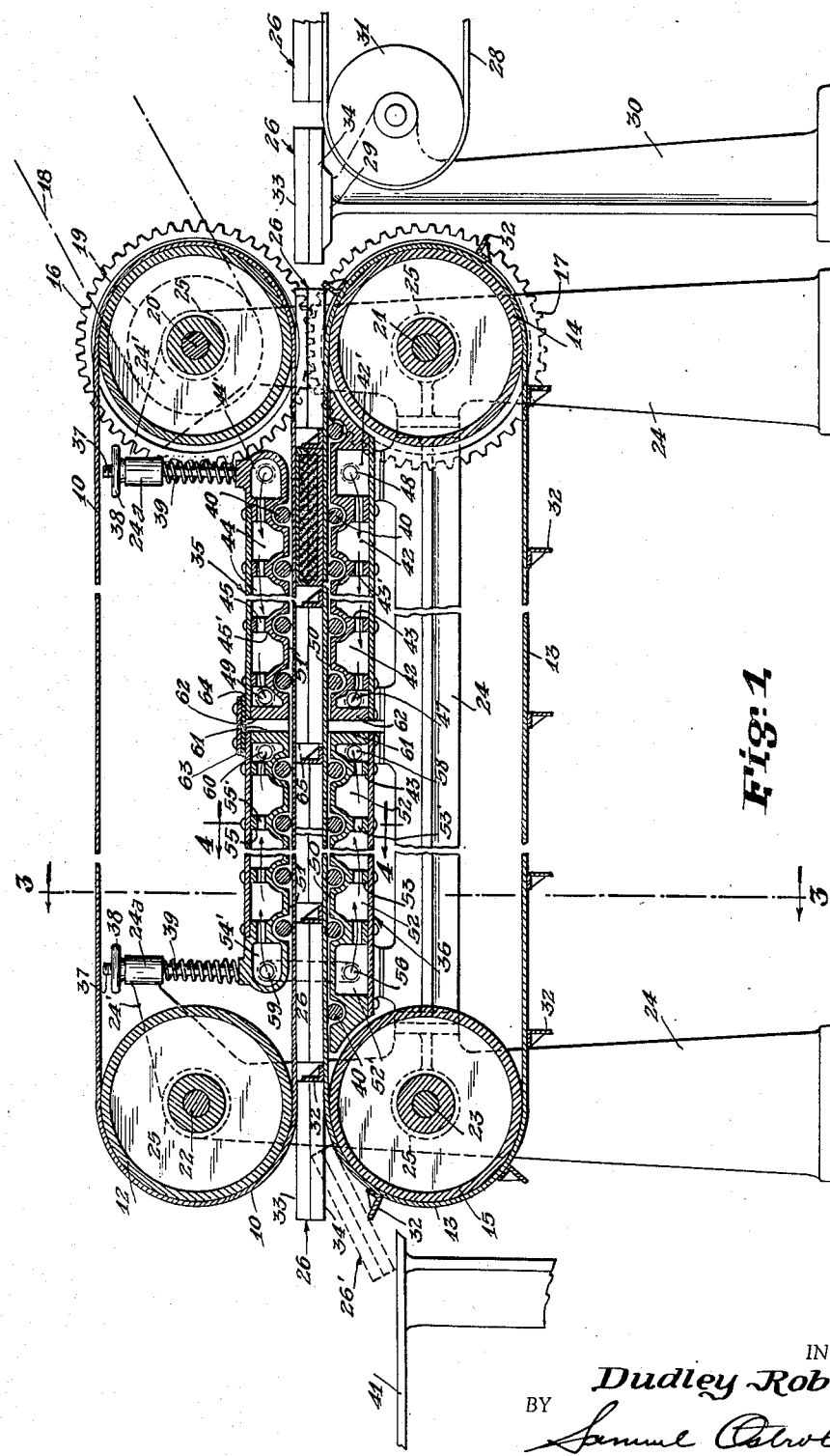
Figure 1 is a sectional elevation of apparatus for continuously effecting the final heat treating stage in the production of gas expanded rubber products.

A continuous steel sheet 10 is wound around drums 11 and 12 as shown in Figures 1 and 2, and a corresponding continuous steel sheet 13 is wound around drums 14 and 15. These drums are driven by means of the co-acting gears 16 and 17, fastened to the corresponding shafts 20 and 21 of drums 11 and 14. I have shown a belt drive 18 attached to the pulley 19 mounted on shaft 20. The drums 12 and 15 are rotatably mounted on the shafts 22 and 23. This structure is supported on frame 24 which houses the bearings 25 for the several shafts.

The molds 26 containing the gassed rubber dough 27 are conveyed to the apparatus by means of the conveyor belt 28 onto the table 29 at the front of the molding machine. The frame structure 30 supports the pulleys 31 for the conveyor belt 28. The continuous steel sheet 13 has a series of transverse steel channels 32 attached thereto. Molds 26 are introduced between the steel sheets 10 and 13 at the right of the apparatus as viewed in Figure 1. The drum 11 rotates clockwise and the drum 14 rotates counter-clockwise so that the inner co-acting portions of the steel sheets 10 and 13 are moved from right to left at the same speed. When a mold 26 is introduced between these sheets, it is automatically carried on through the machine. The transverse channels 32 serve to assist the mold in its progress from right to left. The steel sheets in juxtaposition with the top 33 and bottom 34 of the mold 26 exert a large pressure thereon to counteract the internal forces of the gassed rubber during expansion, and hold the mold 26 intact.

A series of interconnecting chambers 35 and 36, through which the molds 26 are passed for heat treatment, are mounted as shown in Figure 1. The bottom set of chambers 36 is rigidly mounted on the frame 24 and presses against the inside surface of the steel sheet 13 as illustrated. The top set of chambers 35 is mounted on extensions 24' of the frame 24 by means of threaded rods 37 extending through bosses 24a at the end of the extensions 24' and co-acting with the threaded adjusting wheel 38. Heavy springs 39 are placed on the shafts 37 between the chamber structure 35 and the bosses 24a. The springs 39 are under compression, and are designed to exert a large pressure between the bosses 24a and the structure 35. This pressure is applied directly to the moving steel sheet 10 through a plurality of rollers 40. These rollers 40 are mounted on the structure 35 and present a practical rolling friction to the progress of the moving steel sheets 10 and 13, to prevent excessive friction of the chambers 35 and 36 with the moving sheets. The heat treating chambers 35 and 36 are arranged so that the first section that the molds pass through are steam heated and the final section is water cooled as illustrated in Figure 1 and described as follows:

The bottom section 36, rigidly mounted on the frame 24, contains a series of steam chambers 42 interconnected by channels 43', in the ribs 43. A corresponding series of steam chambers 44 interconnected by channels 45' in the ribs 45 are arranged directly above, in the section 35. Steam is admitted through steam inlet valve 46 to the first steam chamber 42'. The steam flows across through the chambers 42 to the steam outlet or return valve 47. A flexible pipe 48 connects the end of steam chamber 42' with the corresponding chambers 44' above it so that the steam inlet to the opposite end of the chamber 42' will also pass into chamber 44' and on through the top steam chambers 44 down through another flexible pipe connection 49 and back to the steam outlet 47. Steam is thus circulated through the steam chambers 42 and 44. Flexible pipe connections 48 and 49 are used to permit the section 35 containing the chambers 44 to move vertically. Surfaces 50 and 51 of the steam chambers are close to the moving steel sheet and transmit heat on through to the molds 26 passing between them. The rollers 40 are mounted at the steam chamber structure as seen in Figures 1 and 4.

At the opposite end of the sections 35 and 36, water is circulated through chambers of construction similar to the steam chambers. Water chambers 52 interconnected by channels 53' in ribs 53 are in the fixedly mounted section 36; water chambers 54 interconnected by channels 55' in ribs 55 are in the adjustably mounted section 35. Cold water is admitted through the water inlet valve 56, and through the inlet pipe 57 (as seen in Figure 3), passes on to the water chamber 52' at the left end of the section 36, circulates through the water chamber 52, and passes out through the water outlet or return valve 58. Flexible pipe connection 59 permits the incoming cold water to pass into the chamber 54' or through the other chambers 54 and out through another flexible pipe connection 60 and then out through the outlet valve 58.

The steam portion may preferably be about two-thirds of the total length of the sections 35 and 36, the water section being the remaining one-third. This ratio is optional in the original design of the unit. Inside ends 61 of the water section and the corresponding inside ends 62 of the steam section are arranged so that a minimum of metallic contact is had between them. A steel plate 63 is bolted across the top, as shown, with a layer of insulation material 64 placed between plate 63 and the chambers. The sides of the section 35 are rigidly joined together by means of suitable end flanges 65 shown dotted in Figure 1.

The section 35 will thus act as a rigid unit and press the rollers 40 down upon the steel sheet 10. The adjusting wheels 38 prevent the section 35 from moving down too far when no molds are under it. The sides 63' and 64' of the molds 26 are preferably notched and grooved (as shown at 65 in Figure 4) to avoid any tendency of the top 33 and bottom 34 to be moved with respect to each other as the mold passes through the machine.

The gassed rubber 27 in the molds 26 is accordingly continuously heat treated. The molds are introduced between revolving sheets which convey them between steam chambers which impart the requisite heating to the gassed dough to cause it to expand and fill the mold. The internal pressure exerted against the mold is counteracted externally by the rollers 40 which press against the steel sheets 10 and 13 to hold the mold intact. The rollers 40 offer a reasonable frictional resistance to the progress of the moving steel sheets. The rate at which the molds are made to pass through the machine depends upon the length of the steam chest, the composition of the dough used and the thickness of the mold. The mold passes on through the cooling section of the machine which is similar to the steam section except that water is circulated therethrough instead of steam. The cooling of the molds eliminates the internal pressure due to the gas expanded rubber and permits the completed mold 26 to be discharged at the far end of the machine as shown in Figure 1, onto the table 41.

Although I have described in detail one embodiment of my invention, it will be obvious that my process may be carried out with many modifications which would still be within the spirit and scope of my invention, and I accordingly do not intend to be limited, for example, as to the arrangement of the steam chambers, water chambers, pressure exerting means on the chamber structure, by the type of conveyor means, by the mold construction or by the composition of the product to be molded except as set forth in the following claims.

I claim:

1. A device for molding gas expanded rubber products contained in separable molds comprising a first continuous metallic sheet; a second continuous metallic sheet; transverse ribs secured to and spaced longitudinally along said second continuous metallic sheet for engaging and conducting molds through the device; means for driving said continuous metallic sheets; said second continuous metallic sheet being disposed below said first continuous metallic sheet and having an upper horizontal area travelling in the same direction but in opposed spaced relation to the lower horizontal area of said first continuous metallic sheet; a separable mold adapted to be engaged between said continuous metallic sheets;

means for resisting the vertical displacement of the continuous metallic sheets by the expanding rubber in the mold, said means for resisting displacement being so adjusted as to retain the molds passing between said continuous metallic sheets in tightly closed relation; a heating chamber disposed within at least one of the continuous metallic sheets; and a cooling chamber disposed within at least one of the continuous metallic sheets; said heating chamber and said cooling chamber being so positioned as to subject the mold travelling between the continuous metallic sheets first to a positive heating action and secondly to a positive cooling action.

2. A device for molding gas expanded rubber products contained in separable molds comprising a first continuous metallic sheet; a second continuous metallic sheet; transverse ribs secured to and spaced longitudinally along said second continuous metallic sheet for engaging and conducting molds through the device; means for driving said continuous metallic sheets; said second continuous metallic sheet being disposed below said first continuous metallic sheet and having an upper horizontal area travelling in the same direction but in opposed spaced relation to the lower horizontal area of said first continuous metallic sheet; a separable mold adapted to be engaged between said continuous metallic sheets; means for resisting the vertical displacement of the continuous metallic sheets by the expanding rubber in the mold, said means for resisting displacement being so adjusted as to retain the molds passing between said continuous metallic sheets in tightly closed relation; a heating chamber disposed within at least one of the continuous metallic sheets; and a cooling chamber disposed within at least one of the continuous metallic sheets; said heating chamber and said cooling chamber being so positioned as to subject the mold travelling between the continuous metallic sheets first to a positive heating action and secondly to a positive cooling action; said heating and cooling chambers being so positioned as to cause any vertical displacement of the continuous metallic sheets to be positively resisted.

3. A device for molding gas expanded rubber products contained in separable molds comprising a first continuous metallic sheet; a second continuous metallic sheet; transverse ribs secured to and spaced longitudinally along said second continuous metallic sheet for engaging and conducting molds through the device; said transverse ribs having a height less than the distance between the two metallic sheets; means for driving said continuous metallic sheets; said means for driving said continuous metallic sheets being positively interconnected with each other; said second continuous metallic sheet being disposed below said first continuous metallic sheet and having an upper horizontal area travelling in the same direction but in opposed spaced relation to the lower horizontal area of said first continuous metallic sheet; a separable mold adapted to be engaged between said continuous metallic sheets; means for resisting the vertical displacement of the continuous metallic sheets by the expanding rubber in the mold, said means for resisting displacement being so adjusted as to retain the molds passing between said continuous metallic sheets in tightly closed relation; a heating chamber disposed within at least one of the continuous metallic sheets; and a cooling chamber disposed within at least one of the continuous metallic sheets; said heating chamber and said cooling chamber being so positioned as to subject the mold travelling between the continuous metallic sheets first to a positive heating action and secondly to a positive cooling action; said heating and cooling chambers being so positioned as to cause any vertical displacement of the continuous metallic sheets to be positively resisted.

DUDLEY ROBERTS.